United States Patent
Kleinpeter et al.

(10) Patent No.: US 11,585,461 B2
(45) Date of Patent: Feb. 21, 2023

(54) ARMATURE

(71) Applicant: Endress+Hauser Conducta GmbH+Co. KG, Gerlingen (DE)

(72) Inventors: Arne Kleinpeter, Neustadt an der Weinstraße (DE); Jens Bindrich, Klingenberg (DE); Angela Eubisch, Chemnitz (DE); Melanie Ullrich, Gerlingen (DE); Jörg Uhle, Limbach-Oberfrohna (DE); Carsten Schippan, Grimma (DE); Thomas Pfauch, Leipzig (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 0 days.

(21) Appl. No.: 17/394,634

(22) Filed: Aug. 5, 2021

(65) Prior Publication Data

US 2022/0042621 A1 Feb. 10, 2022

(30) Foreign Application Priority Data

Aug. 6, 2020 (DE) .................. 10 2020 120 823.5

(51) Int. Cl.
*F16K 5/06* (2006.01)
*F16K 37/00* (2006.01)

(52) U.S. Cl.
CPC ............ *F16K 37/00* (2013.01); *F16K 5/0647* (2013.01)

(58) Field of Classification Search
CPC ...... F16K 5/0605; F16K 5/0647; F16K 37/00; F16K 37/041; F16K 37/005; F16K 37/0058; F16K 37/0075; F16K 37/0091; G01F 15/005
See application file for complete search history.

(56) References Cited

U.S. PATENT DOCUMENTS 3,352,155 A * 11/1967 Penet .................. G01F 1/115
251/315.15
5,560,392 A * 10/1996 Spang .................. F16K 37/00
251/315.11

FOREIGN PATENT DOCUMENTS

DE 3428913 A1 10/1985
DE 3809288 C1 2/1989
DE 3815710 A * 11/1989 .......... F16K 5/0605
(Continued)

OTHER PUBLICATIONS

DE3815710A English Translation (Year: 2022).*
DE9113951U1 English Translation (Year: 2022).*

*Primary Examiner* — Hailey K. Do
(74) *Attorney, Agent, or Firm* — Mark A. Logan; Endress+Hauser (USA) Holding, Inc.

(57) ABSTRACT

Disclosed is an armature for receiving a sensor for measuring a medium in a container. The armature includes a hollow cylindrical housing designed to connect the armature to the container at least sectionally in the container. The housing includes first and second openings through which medium flows in or out; a service chamber formed in the interior of the housing between the first and second openings; a rotationally movable closing element in the housing, which, in a first position, opens the first and second openings to the medium and, in a second position, blocks a flow through the first and second openings; a sensor holder; and the sensor arranged on or in the sensor holder. The sensor holder is designed such that the sensitive element is arranged in the service chamber in the measuring/service position.

13 Claims, 5 Drawing Sheets

(56) References Cited

FOREIGN PATENT DOCUMENTS

| DE | 9113951 U1 | * | 11/1991 | ........... F16K 5/0605 |
|----|---|---|---|---|
| DE | 29721863 U1 | | 2/1999 | |
| DE | 202014101580 U1 | | 6/2014 | |
| DE | 102018130979 A1 | | 4/2020 | |
| EP | 1887348 A1 | | 2/2008 | |
| EP | 2385280 A1 | * | 11/2011 | ........... F16K 5/0605 |
| GB | 2174788 A | * | 11/1986 | ........... F16K 5/0605 |
| SE | 438194 B | * | 12/1978 | ............... F16K 5/06 |

* cited by examiner

ARMATURE

CROSS-REFERENCE TO RELATED APPLICATION

The present application is related to and claims the priority benefit of German Patent Application No. 10 2020 120 823.5, filed on Aug. 6, 2020, the entire contents of which are incorporated herein by reference.

TECHNICAL FIELD

The present disclosure relates to an armature for receiving a sensor designed to measure at least one measurand of a medium in a container.

BACKGROUND

Armatures, for example retractable armatures, are widely used in analytical measurement technology and process automation. They are used for removing sensors from the process, and thus from the medium, without interrupting the process, and for then reintroducing them into the process. The sensors are fastened in a dip tube and are moved axially by hand or automatically, for example pneumatically, by means of a drive between a process position (measurement) and a service position (maintenance, calibration, flushing, probe exchange, etc.). These processes take place within a certain period of time, depending on the drift of the measured value or the contamination of the measuring element. The sensors are used to measure one or more physical or chemical process variables.

A great variety of retractable armatures are offered and marketed by the Endress+Hauser corporate group, for example under the name "Cleanfit CPA871."

In such a retractable armature, a sensor holder with a sensor is moved linearly along the main axis of the armature into a process, i.e., into the medium. The movement results in the transition from the service position (sensor is isolated from the process, for example for cleaning or calibration) into a measuring position (sensor is in the process). In the service position, the seal to the environment or to the process is effectuated, for example, by a pin with polymer seals. This region is traversed by the above-described linear movement from the service position into the measuring position or vice versa, resulting in high stress and signs of wear. Long travel paths require long sensor holders. In this case, there is a risk of adhesion to the pipe, which can greatly stress the sealing system, especially in the case of polymers. The seals must thus be replaced frequently. Due to the process, the movement additionally stresses the sensor. Adhesions due to caking and/or crystallizing media moreover increase the risk of glass breakage during installation and removal of the sensor when using pH glass sensors.

SUMMARY

The present disclosure is based on the object of minimizing mechanical loads on the sensor and the armature arising from the method but also at the same time achieving high immersion depths.

The object is achieved by an armature for receiving a sensor designed to measure at least one measurand of a medium in a container comprising a substantially hollow cylindrical housing that is designed to connect the armature to the container and is arranged at least sectionally in the container; wherein the housing comprises a first opening and a second opening through which medium flows in or out; a service chamber which is formed in the interior in a region of the housing between the first and second openings; a rotationally movable closing element in the housing which, in a first position, releases a flow through the service chamber from the first opening to the second opening and, in a second position, blocks a flow through the service chamber; a sensor holder; and the sensor which has a sensitive element and is arranged on or in the sensor holder, wherein the sensor holder is designed such that the sensitive element is arranged in the service chamber in the measuring/service position.

One embodiment provides that the closing element is designed as a ball or plug.

One embodiment provides that the sensor holder comprises a thread, especially an internal thread, and the sensor, especially having an external thread, is screwed thereinto.

One embodiment provides that the sensor holder can be moved axially in the housing at least between a measuring/service position and an external position.

One embodiment provides that the sensor holder can be moved manually, pneumatically, or with a motor into and out of the measuring/service position.

One embodiment provides that the sensor holder is connected to the housing by means of a quick-release connector, especially, a bayonet connector.

One embodiment provides that the sensor holder is designed in correspondence to the immersion depth in the service chamber.

One embodiment provides that at the end region on the service chamber side, the sensor holder comprises a protective basket for the sensitive element of the sensor.

One embodiment provides that the housing comprises one or more seals which seal the service chamber from the environment.

One embodiment provides that the housing comprises a scraper seal by means of which medium is scraped from the sensor during the movement of the sensor holder out of the measuring/service position.

One embodiment provides that the housing comprises at least two flushing connections to the service chamber, wherein the closing element blocks access of the flushing connections to the service chamber in the first position and releases it in the second position.

One embodiment provides that the flushing connections are each arranged at a 90° offset from the first or second opening.

One embodiment provides that a handle for moving the closing element is arranged thereupon.

BRIEF DESCRIPTION OF THE DRAWINGS

This is explained in more detail with reference to the following figures.

DETAILED DESCRIPTION

In the figures, the same features are identified by the same reference signs. "Top," "above," and related terms within the meaning of this present disclosure mean facing away from the measuring medium 14. "Bottom," "below," and related terms within the meaning of this present disclosure mean facing the medium 14.

Figure 1:
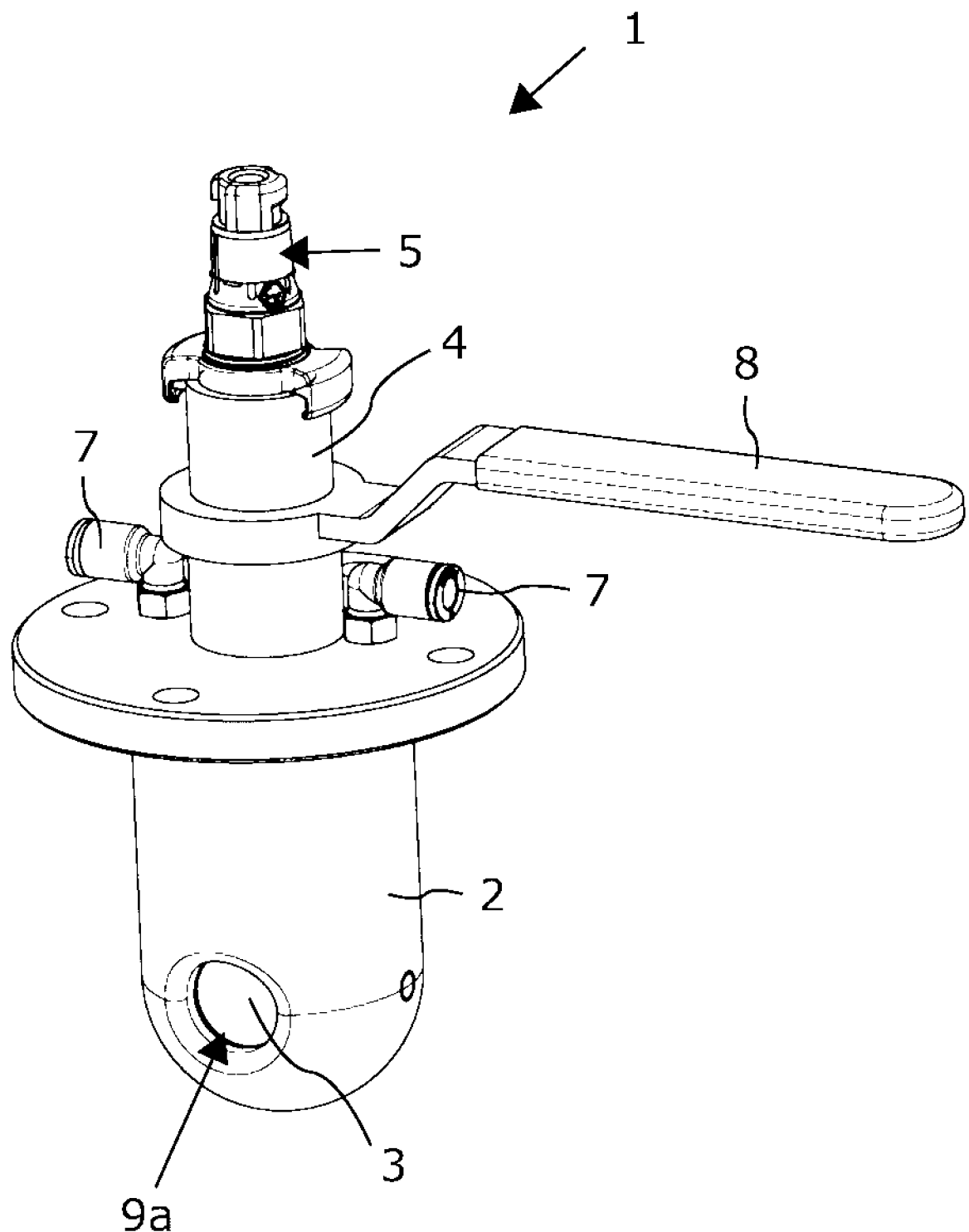
FIG. 1 shows the claimed armature in a three-dimensional view in the second position.

The claimed armature in its entirety has reference sign 1 and is shown in FIG. 1.

In the following, the armature 1 is explained as a ball element with reference to the design of the closing element 3 (see below). The armature corresponds to a type of ball armature. With few modifications, the idea can also be used when the closing element 3 is designed as a plug element, i.e., the armature 1 is a type of plug valve.

When an armature 1 having a ball element, the latter comprise a drilled-through ball as a shut-off body 3 and are also referred to as ball valves. The shut-off body 3 is also referred to as a closing element. Characteristic of such an armature is the complete closing by rotation of the closing element 3 by 90°. A rotational movement thus takes place. These armatures can be equipped with actuators in order to automate opening and closing. By rotating the ball (i.e., the closing element 3) by 90°, it can thus be achieved that medium flows through the armature 1 or is prevented therefrom. The closing element can also be designed as a drilled roller or round bar.

The armature 1 comprises a substantially cylindrical housing 2 that is designed to connect to a container. For this purpose, the housing comprises connecting means. The connecting means can be designed, for example, as a welded or flange connection, for example made of stainless steel. However, other embodiments are possible. The measuring medium 14 to be measured is located in the container. The container can be, for example, a tank, boiler, pipe, pipeline, or the like.

Figure 3:
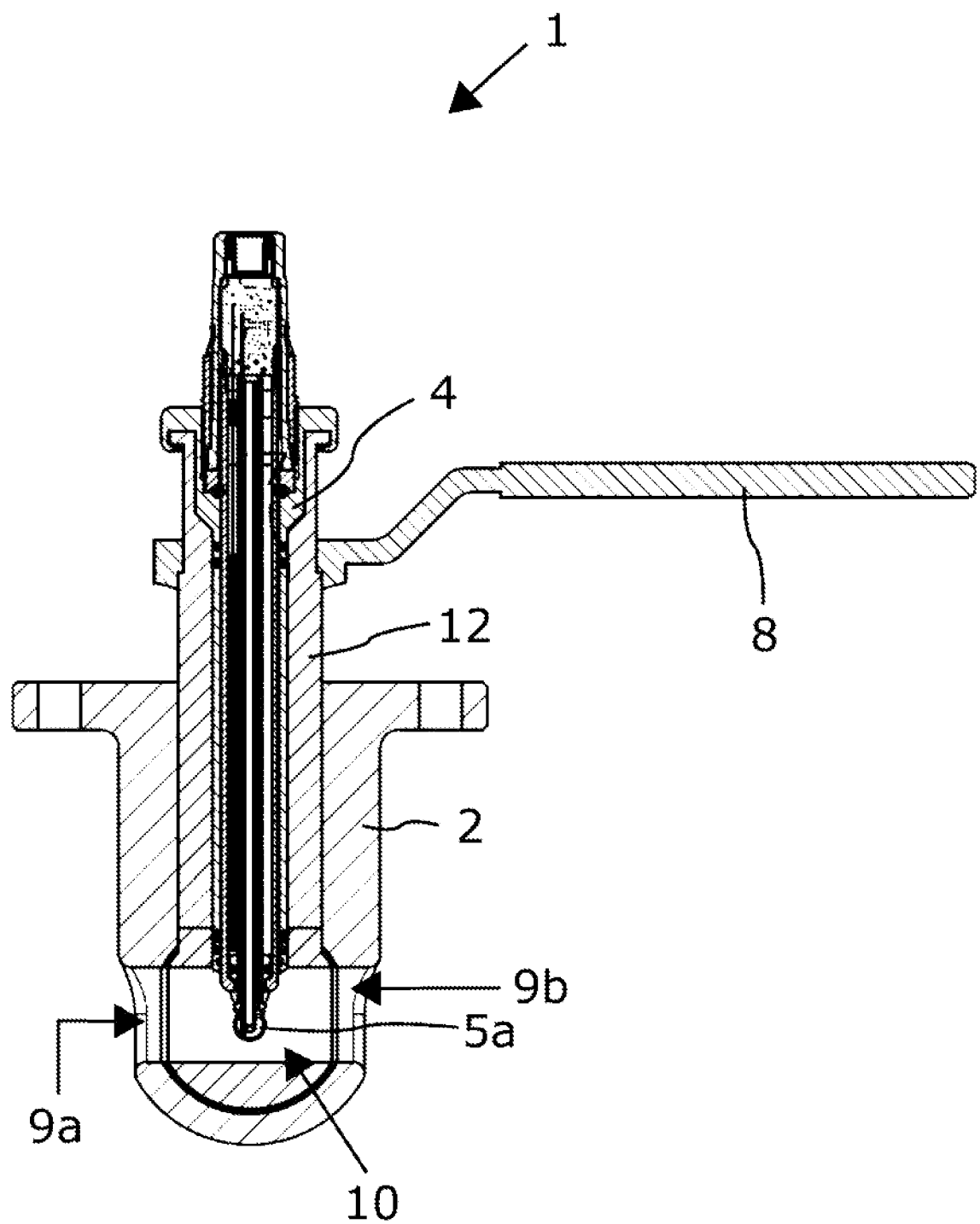
FIG. 3 shows the claimed armature in a side view in cross-section in the first position.

The housing comprises first and second openings 9a, 9b through which the medium can flow in or out. The region of the armature 1 between the openings 9a, 9b formed by the housing is referred to as the service chamber 10. A cross-section through the armature 1, which shows the openings, is shown in FIG. 3. By rotating the closing element 3, a flow through the service chamber 10 is released (first position of the closing element) or blocked (second position of the closing element).

Figure 2:
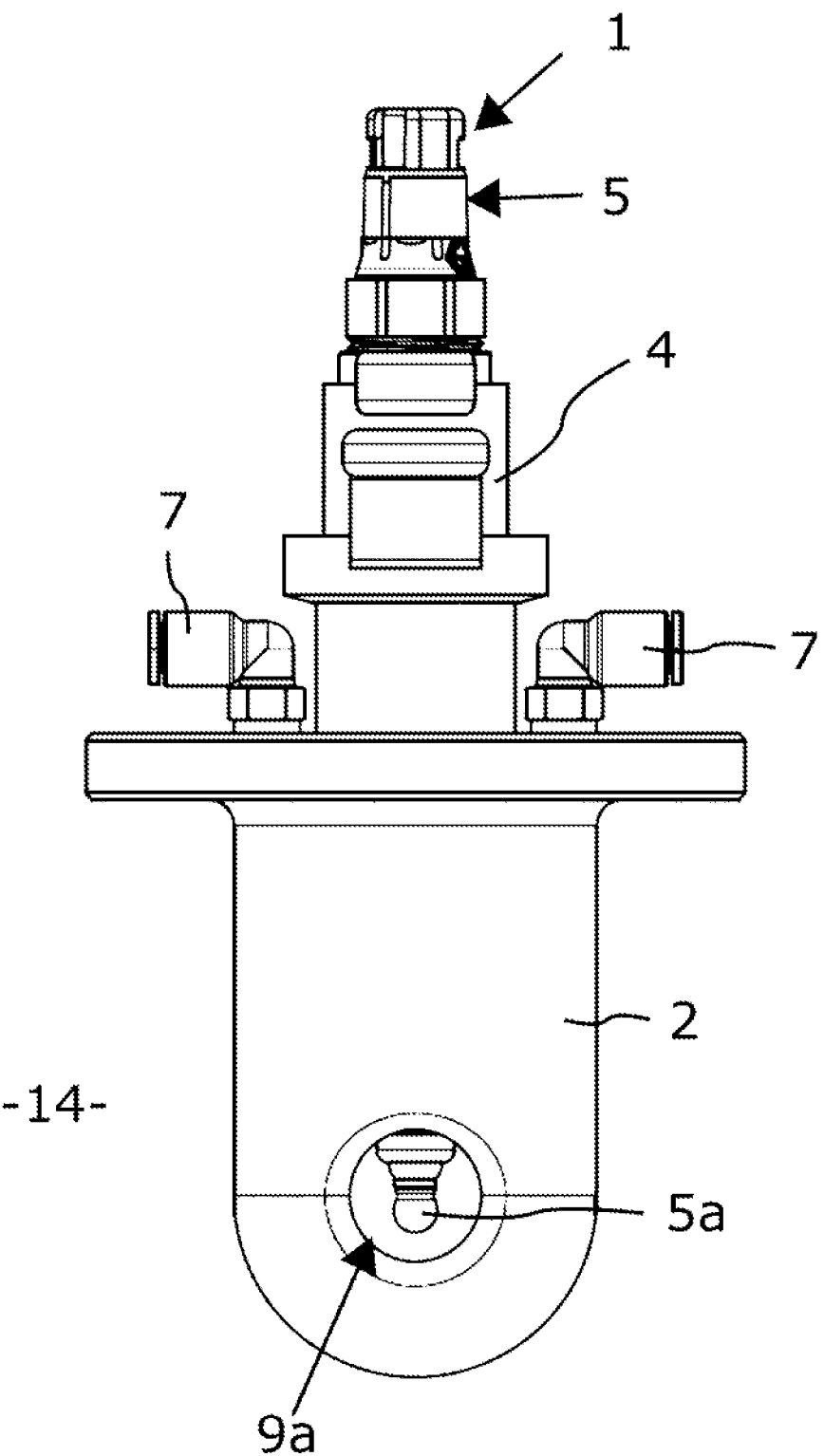
FIG. 2 shows the claimed armature in a side view in the first position.
Figure 4:
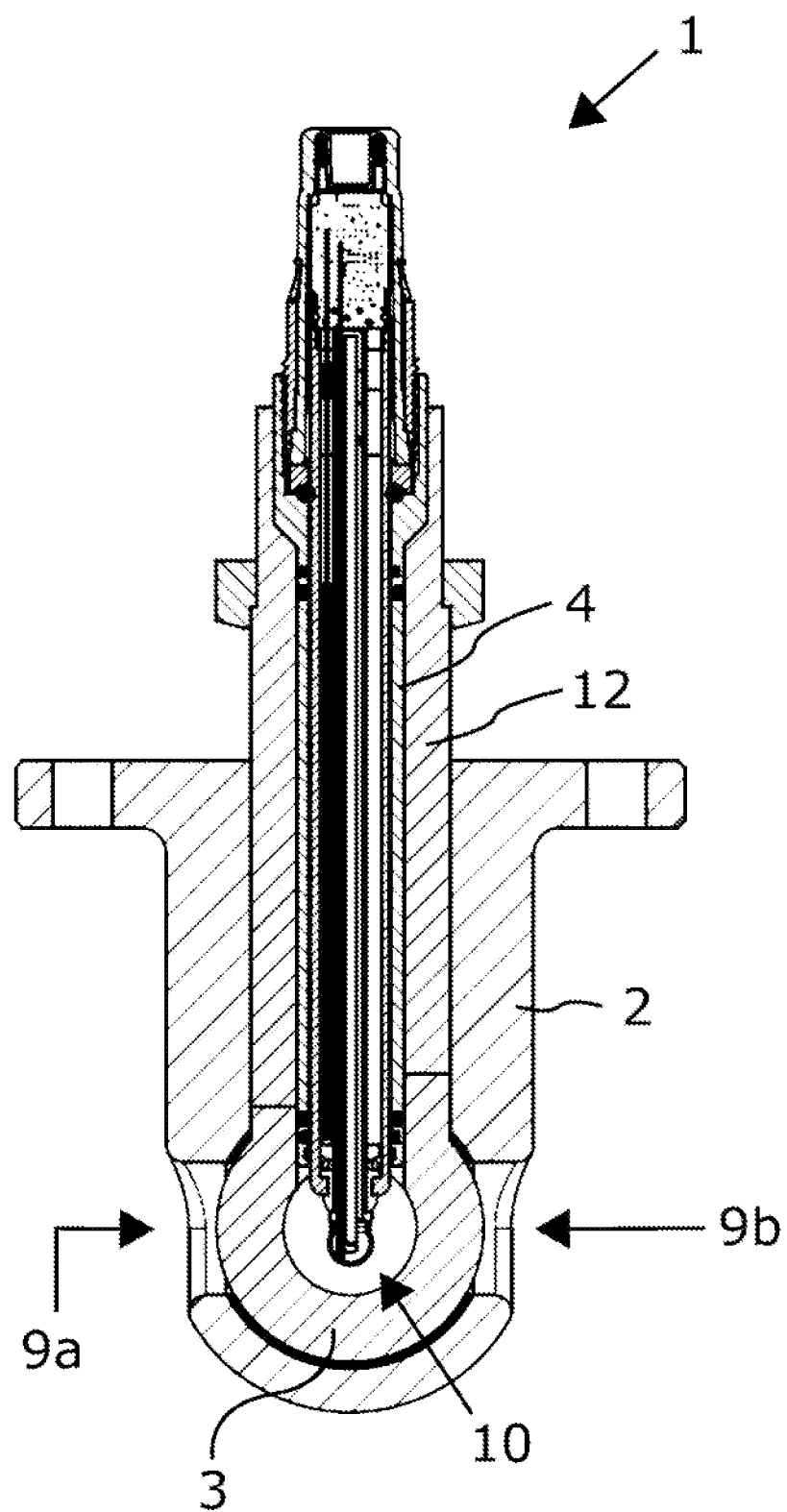
FIG. 4 shows the claimed armature of FIG. 3 in the second position.

FIG. 1 and FIG. 2 show the armature 1 in the closed and open positions, respectively. FIG. 3 and FIG. 4 show a cross-section through the armature 1 in the open position and closed positions, respectively.

The armature 1 comprises the movable closing element 3 in the housing 2 which, in the first position, releases a flow of the medium through the housing 2 and, in the second position, blocks a flow of the medium through the housing. In the embodiment as a ball valve, the closing element is designed as a drilled ball; in the embodiment as a plug valve, the closing element is a (frusti)conical so-called plug. The first position is also referred to as the open position, and the second position is correspondingly referred to as the closed position.

The armature 1 furthermore comprises a sensor holder 4. A sensor 5 is arranged on or in the sensor holder 4. The sensor holder 4 is designed, for example, as a carriage; the sensor 5 then rests "against" the sensor holder 4. The sensor holder 4 may also be designed as a hollow-cylindrical component; the sensor 5 is then located "in" the sensor holder 4. In both cases, an opening for the sensitive element 5a of the sensor 5 is at the bottom end.

The sensor holder 4 has, for example, an internal thread into which a sensor 5 having an external thread is screwed. In general, said sensor is connected at a first end (usually at the top) to the sensor holder. A portion of the sensor holder 4 is located in the housing 2, and a portion is located outside the housing 2.

In one embodiment, the sensor holder 4 is movable in the housing between a measuring/service position and an external position. If the sensor holder 4 is in the measuring/service position, the sensor 1 is arranged such that it is located with its sensitive element 5a in the service chamber 10.

The sensor 5 itself is thus not displaced but rather mounted in the armature 1 by means of the sensor holder 4. In addition to the simple (de)assembly of the sensor 5, the object of the sensor holder 4 is especially to more easily service the process seal 6 (see below) to the sensor 5. As a result of the sensor holder 4, it is furthermore possible to use sensors even at higher immersion depths. The sensor is, for example, 120 mm long. The short, less expensive sensors that are usually normally in stock can thus be installed, and a high immersion depth is nevertheless possible. In addition, the extension of the holder allows the immersion depth to be scaled. The sensor holder 4, including the already preassembled sensor 5, can be mounted in the armature 1 by means of a quick-release connector (e.g., bayonet). The holder 4 can be inserted manually into the armature 1. The movement may also take place by means of a pneumatic device or a motor.

Arranged on the housing 2 is a guide body 12 which projects at least sectionally into the housing; see, for example, FIG. 4.

The sensor holder 4 is arranged in the housing by means of the guide body 12 such that the sensor 5 projects by the bottom end into the service chamber 10; the medium 14 thus washes around the sensor 5 in the first position of the closing element 3, and the sensor 5 is separated from the medium 14 in the second position of the closing element 3. The sensor holder 4 is adapted to the length of the sensor so that the sensor 5 with its sensitive region 5a always projects into the service chamber 10. The sensor holder 4 is designed in correspondence to the immersion depth of the sensor 5 in the service chamber 10. At the bottom end region, the sensor holder 4 comprises a protective basket 15 for the sensitive element 5a of the sensor 5; see, for example, FIG. 5.

The sensor holder 4 is connected to the housing 2 or the guide body 12 by means of a quick-release connector, especially, a bayonet connector.

Figure 5:
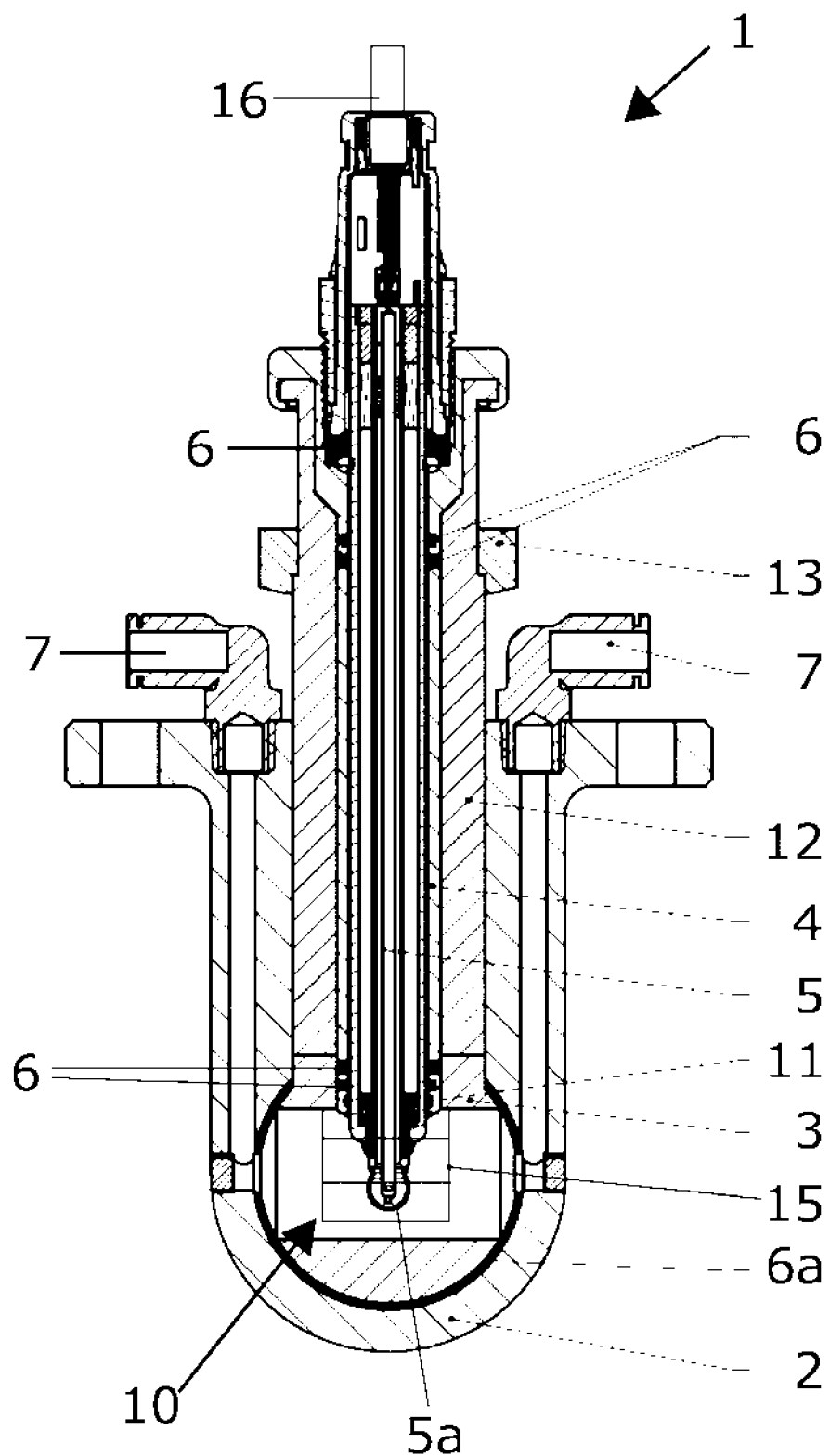
FIG. 5 shows the claimed armature of FIG. 2 in cross-section.

One or more seals 6 are arranged on the sensor holder 4 and seal the flow region from the environment; see, for example, FIG. 5. The term "environment" refers to everything outside the container and outside the armature. The closing element 3 also comprises a seal 6a (see FIG. 5), which also serves to seal against the environment. The seal 6a is designed as a seal seat and has, for example, a (hollow) spherical shape or consists of two half-shells.

Introduced into the housing 2 is a scraper seal 11 by means of which medium 14 is scraped from the sensor 5 during the movement of the sensor holder 4 out of the measuring/service position.

A handle 8 is attached to the closing element 3 via the guide body 12. The attachment of the handle 8 to the guide body 12 is shown, for example, in FIG. 3. The attachment of the guide body 12 to the closing element 3 is shown, for example, in FIG. 4. As a result, the closing element 3 can be rotated easily. The closing element 3 may also be operated pneumatically or electrically, for example with a swivel drive.

In order to flush the sensor 5 in the closed position, at least two flushing connections 7 are attached to the housing 2 with holes up to the service chamber 10. In the open position, the armature is open to the medium 14 which flows around the sensor 5; this is the the first position. In the closed position, the armature 1 is open to the flushing connection 7. The medium thus does not flow through the armature, i.e., through the openings 9a and 9b; rather, the medium 14 is blocked. The flushing connections 7 are correspondingly released and the service chamber 10 can be flushed therethrough. The sensor 5 may also be flushed, calibrated, adjusted, etc. Flushing/cleaning/calibration and/or sterilization medium can be introduced into the service chamber 10 through the one connection 7. The flushing/cleaning/calibration and/or sterilization medium can be liquid or gaseous. The liquid can flow out again through the respective other flushing connection 7. The flushing connections 7 also allow convenient removal of residual medium from the armature 1, more precisely from the service chamber 10.

The sensor 5 within the meaning of this present disclosure includes sensors for measuring one or more physical or chemical process variables. The sensor 5 comprises a sensitive region 5a, for example for measuring the pH value, also via an ISFET, redox potential, absorption of electromagnetic waves in the medium 14, for example with wavelengths in the UV, IR, and/or visible ranges, oxygen, conductivity, turbidity, concentration of metal and/or non-metal materials, or temperature. The sensor 5 is connected to a cable 16 (symbolically illustrated in FIG. 5). The cable 16, in turn, is connected to a transmitter not shown. The sensor 5 is designed as, for example, as a digital sensor with a microcontroller and memory; especially, the sensor 5 is an inductive sensor; especially, the sensor 5 supports plug & play with the transmitter connected thereto. The applicant sells such sensors under the name "Memosens." The sensor 5 has a diameter of 12 mm, for example.

The sensor holder 4 can be made of different materials, for example steel or stainless steel. Also possible, for example in the chemical industry, are very resistive materials. The sensor holder 4 may thus also be made of a plastic, such as polyether ether ketone (PEEK), polytetrafluoroethylene (PTFA), a perfluoroalkoxy polymer (PFA), another plastic, or resistive metals, such as Hastelloy. A ceramic may also be used. Especially, the closing element is made of a ceramic. Another option is the use of one or more coatings of the aforementioned polymers. The same applies to the housing 2 or the guide body 12.

The invention claimed is:

1. An armature for receiving a sensor designed to measure at least one physical or chemical process variable of a medium in a container, the armature comprising:
   - a hollow cylindrical housing designed to connect the armature to the container and to be arranged at least sectionally in the container, wherein the hollow cylindrical housing includes a first opening and a second opening through which medium flows in or out;
   - a service chamber formed in the interior in a region of the hollow cylindrical housing between the first and second openings;
   - a rotationally movable closing element in the hollow cylindrical housing which, in a first position, releases a flow through the service chamber from the first to the second opening and, in a second position, blocks a flow through the service chamber;
   - a sensor holder and
   - a sensor which has a sensitive element and is arranged on or in the sensor holder, wherein the sensor holder is designed such that the sensitive element is arranged in the service chamber in a measuring/service position.

2. The armature according to claim 1, wherein the rotationally movable closing element is designed as a ball or a plug.

3. The armature according to claim 1, wherein the sensor holder includes a thread and the sensor is screwed thereinto.

4. The armature according to claim 1, wherein the sensor holder is movable axially in the hollow cylindrical housing at least between the measuring/service position and an external position.

5. The armature according to claim 1, wherein the sensor holder is movable manually, pneumatically, or with a motor into and out of the measuring/service position.

6. The armature according to claim 1, wherein the sensor holder is connected to the hollow cylindrical housing by means of a quick-release connector.

7. The armature according to claim 1, wherein the sensor holder is designed in correspondence to an immersion depth in the service chamber.

8. The armature according to claim 1, wherein at an end region on the service chamber side, the sensor holder includes a protective basket for the sensitive element of the sensor.

9. The armature according to claim 1, wherein the hollow cylindrical housing includes one or more seals that seal the service chamber from an environment outside of the service chamber.

10. The armature according to claim 1, wherein the hollow cylindrical housing includes a scraper seal by means of which medium is scraped from the sensor during a movement of the sensor holder out of the measuring/service position.

11. The armature according to claim 1, wherein the hollow cylindrical housing includes at least two flushing connections to the service chamber, and wherein the rotationally movable closing element blocks access of the at least two flushing connections to the service chamber in the first position and releases access to the service chamber in the second position.

12. The armature according to claim 11, wherein the at least two flushing connections are each arranged at a 90° offset from the first or second opening.

13. The armature according to claim 11, further comprising:
   - a hollow cylindrical guide body disposed at least partially within the hollow cylindrical housing, wherein the hollow cylindrical guide body is rotationally moveable within the hollow cylindrical housing and is affixed to the rotationally movable closing element, and
   - a handle affixed to the hollow cylindrical guide body and embodied for rotationally moving the hollow cylindrical guide body and the rotationally movable closing element.

* * * * *